US011329837B2

(12) United States Patent
Fu et al.

(10) Patent No.: US 11,329,837 B2
(45) Date of Patent: May 10, 2022

(54) NETWORK DEVICE AND POWER SUPPLY METHOD

(71) Applicant: HUAWEI TECHNOLOGIES CO., LTD., Shenzhen (CN)

(72) Inventors: Shiyong Fu, Nanjing (CN); Yan Zhuang, Nanjing (CN); Jincan Cao, Nanjing (CN); Fuguang Huang, Nanjing (CN); Xueqi Chen, Nanjing (CN); Rui Hua, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 16/391,021

(22) Filed: Apr. 22, 2019

(65) Prior Publication Data

US 2019/0253268 A1    Aug. 15, 2019

Related U.S. Application Data

(63) Continuation of application No. PCT/CN2017/088198, filed on Jun. 14, 2017.

(30) Foreign Application Priority Data

Oct. 21, 2016    (CN) .......................... 201610921520.5

(51) Int. Cl.
*G06F 1/30* (2006.01)
*H04L 12/10* (2006.01)
(Continued)

(52) U.S. Cl.
CPC .............. *H04L 12/10* (2013.01); *G06F 1/266* (2013.01); *G06F 1/30* (2013.01); *H04L 12/40045* (2013.01)

(58) Field of Classification Search
CPC . G06F 1/266; G06F 1/30; H04L 12/10; H04L 12/40045
See application file for complete search history.

(56) References Cited

U.S. PATENT DOCUMENTS 7,478,251 B1 * 1/2009 Diab ...................... G06F 1/189
713/300
7,886,165 B2 * 2/2011 Khan .................... G06F 1/3209
713/300
(Continued)

FOREIGN PATENT DOCUMENTS

CN      102664741 A    9/2012
CN      102761422 A    10/2012
(Continued)

*Primary Examiner* — Phil K Nguyen
*Assistant Examiner* — Brian J Corcoran
(74) *Attorney, Agent, or Firm* — Maier & Maier, PLLC

(57) ABSTRACT

A network device includes a power system, a processor, a power sourcing equipment PSE chip coupled to a first forward power supply port, and a first powered device PD chip coupled to a first reverse power receiving port. A first powered device is connected to the first forward power supply port and the first reverse power receiving port. When detecting that a power failure occurs on the network device, the processor instructs the first PD chip to draw power from the first powered device; the first PD chip draws the power from the first powered device through the first reverse power receiving port, and supplies the obtained power to the power system. Therefore, when a power failure occurs, the network device can continue to obtain power and work properly when the power failure occurs.

13 Claims, 4 Drawing Sheets

(51) Int. Cl.
*G06F 1/26* (2006.01)
*H04L 12/40* (2006.01)

(56) References Cited

U.S. PATENT DOCUMENTS

| | | | |
|---|---|---|---|
| 9,703,650 B1* | 7/2017 | Byers | G06F 1/263 |
| 2005/0080516 A1* | 4/2005 | Pincu | H02J 1/00 |
| | | | 700/297 |
| 2006/0089230 A1 | 4/2006 | Biederman et al. | |
| 2006/0133368 A1* | 6/2006 | Tolliver | H04L 12/44 |
| | | | 370/389 |
| 2010/0205466 A1* | 8/2010 | Diab | H04L 12/40045 |
| | | | 713/310 |
| 2011/0197081 A1 | 8/2011 | Where et al. | |
| 2013/0013949 A1* | 1/2013 | Mohammed | H04L 12/10 |
| | | | 713/340 |
| 2014/0359320 A1* | 12/2014 | Hua | G06F 1/26 |
| | | | 713/300 |
| 2015/0127957 A1* | 5/2015 | Sethi | G06F 1/26 |
| | | | 713/300 |
| 2016/0055354 A1 | 2/2016 | Jinaraj et al. | |
| 2016/0064938 A1* | 3/2016 | Balasubramanian | H04L 12/10 |
| | | | 307/11 |
| 2017/0134263 A1* | 5/2017 | Zhang | H04L 1/22 |

FOREIGN PATENT DOCUMENTS

| | | |
|---|---|---|
| CN | 103944739 A | 7/2014 |
| CN | 203813806 U | 9/2014 |
| CN | 104618123 A | 5/2015 |
| CN | 104793544 A | 7/2015 |
| CN | 105812147 A | 7/2016 |
| CN | 105897432 A | 8/2016 |

\* cited by examiner

NETWORK DEVICE AND POWER SUPPLY METHOD

CROSS-REFERENCE TO RELATED APPLICATIONS

This application is a continuation of International Application No. PCT/CN2017/088198, filed on Jun. 14, 2017, which claims priority to Chinese Patent Application No. 201610921520.5, filed on Oct. 21, 2016. The disclosures of the aforementioned applications are hereby incorporated by reference in their entireties.

TECHNICAL FIELD

The present invention relates to the field of power supply technologies, and in particular, to a power supply apparatus and method.

BACKGROUND

A power over Ethernet (English: Power over Ethernet, PoE for short) system includes power sourcing equipment (English: power sourcing equipment, PSE for short) and a powered device (English: powered device, PD for short), and the PSE supplies a direct current to the PD by using an Ethernet cable.

On a PoE network, once a power failure occurs on the power sourcing equipment, the power sourcing equipment can neither work, nor supply power to the powered device. This affects network performance.

SUMMARY

This application provides a network device and a power supply method, so as to reversely draw power from a powered device when a power failure occurs on a network device, thereby avoiding a case in which the network device cannot work after the power failure occurs on the network device.

According to a first aspect, a network device is provided. The network device includes a power system, a processor, a power sourcing equipment PSE chip, a first forward power supply port, a first powered device PD chip, and a first reverse power receiving port, where the PSE chip is connected to the first forward power supply port; the first PD chip is connected to the first reverse power receiving port; the processor is connected to the PSE chip; a first powered device is connected to the first forward power supply port and the first reverse power receiving port;

the power system is configured to supply power to the processor and the PSE chip;

the PSE chip is configured to: when the network device is supplied with power by a power source (the power is input by a local power source and/or forward power over Ethernet), supply power to the first powered device by using the power system;

the processor is configured to: when detecting that a power failure occurs on the network device, instruct the first PD chip to draw power from the first powered device; and the first PD chip is configured to: when the power failure occurs on the network device, draw the power from the first powered device through the first reverse power receiving port, and supply the obtained power to the power system.

In the foregoing solution, when being supplied with the power by the power source, the network device supplies power to the powered device through an Ethernet port; and when the power failure occurs on the network device, the network device may further draw the power from the powered device through the Ethernet port. This ensures that the network device can continue to obtain power and work properly when the power failure occurs on the network device.

Optionally, the processor is further configured to: when the power failure occurs on the network device, instruct, according to a power management policy, the PSE chip to supply power to a powered device other than the first powered device by using the power system.

In the foregoing solution, when the power failure occurs on the network device and after the network device draws the power from the powered device, the network device supplies power to the processor, the PSE chip, or another component included in the network device, to ensure that the network device works properly; and the network device may further supply power to a powered device other than the powered device from which power is drawn, so as to continue to supply, when the power failure occurs on the network device, power to another powered device to which no power is input, thereby improving stability of POE power supply.

Optionally, the powered device other than the first powered device includes at least two devices, and during instructing, according to the power management policy, the PSE chip to supply the power to the powered device other than the first powered device by using the power system, the processor is specifically configured to: determine power supply priorities of the at least two devices according to a preset priority determining rule, and instruct, based on the power supply priorities of the at least two devices, the PSE chip to supply power to a target powered device by using the power system, where the target powered device includes some or all of the at least two devices.

In the foregoing solution, some or all of the other powered devices are supplied with power based on the priorities of the other powered devices, and when the power drawn from the first powered device is limited, it can be preferentially ensured that a powered device having a high priority works properly, thereby optimizing a power supply effect of the system.

Optionally, during determining the power supply priorities of the at least two devices, the processor is specifically configured to determine the power supply priorities of the at least two devices based on data transmission parameters or port numbers of data ports corresponding to the at least two devices, where the data transmission parameters each are used to indicate at least one of a quantity of connected terminals and data traffic.

This solution provides a method for calculating a power supply priority of a device.

Optionally, the processor is further configured to: obtain required powers corresponding to the at least two devices; calculate a second supply power based on a first supply power, where the first supply power is a power of electric energy drawn through the first reverse power receiving port, and the second supply power is a maximum power used when a PSE chip supplies power to the at least two devices by using a power system; and determine the target powered device based on the power supply priorities of the at least two devices, the required powers corresponding to the at least two devices, and the second supply power.

This solution provides a specific method for determining, based on the power supply priorities, powered devices to which power is supplied.

Optionally, the first forward power supply port and the first reverse power receiving port are a same Ethernet port, or the first forward power supply port and the first reverse power receiving port are two Ethernet ports independent from each other.

Optionally, the network device further includes a second forward power supply port, a second reverse power receiving port, and a second PD chip, where the PSE chip is connected to the second forward power supply port, and the second PD chip is connected to the second reverse power receiving port; a second powered device is connected to the second forward power supply port and the second reverse power receiving port; the PSE chip is further configured to: when the network device is supplied with the power by the power source, supply power to the second powered device by using the power system; and the second PD chip is configured to: when the power failure occurs on the network device, draw power from the second powered device through the second reverse power receiving port, and supply the obtained power to the power system.

Optionally, the network device further includes a forward power receiving port, a reverse power supply port, and a third PD chip, where the forward power receiving port is connected to the third PD chip, and the PSE chip is connected to the reverse power supply port; the processor is connected to the third PD chip; power sourcing equipment is connected to the forward power receiving port and the reverse power supply port; the third PD chip is configured to: when the power sourcing equipment is supplied with power by a power source, receive power from the power sourcing equipment through the forward power receiving port, and supply the obtained power to the power system; and the processor is further configured to: when a power failure occurs on the power sourcing equipment, instruct the PSE chip to supply power to the power sourcing equipment through the reverse power supply port by using the power system.

According to a second aspect, a network device is provided. The network device includes a power system, a processor, a powered device PD chip, a forward power receiving port, a power sourcing equipment PSE chip, and a reverse power supply port, where the PSE chip is connected to the reverse power supply port; the PD chip is connected to the forward power receiving port; the processor is connected to the PSE chip; power sourcing equipment is connected to the forward power receiving port and the reverse power supply port; the power system is configured to supply power to the processor and the PSE chip; the PD chip is configured to draw power from the power sourcing equipment through the forward power receiving port, and supply the obtained power to the power system; the processor is configured to: when no power is supplied to the forward power receiving port, instruct, according to a reverse power supply policy, the PSE chip to supply power to the power sourcing equipment through the reverse power supply port; and the PSE chip is configured to supply, according to a reverse power supply instruction of the processor, the power to the power sourcing equipment by using the power system.

Optionally, the processor is further configured to: when the forward power receiving port is supplied with power, negotiate with the power sourcing equipment to determine a first supply power; and during instructing, according to the reverse power supply policy, the PSE chip to supply the power to the power sourcing equipment through the reverse power supply port, the processor is specifically configured to instruct the PSE chip to supply power to the power sourcing equipment through the reverse power supply port by using the first supply power.

Optionally, the network device further includes a forward power supply port, where the PSE chip is connected to the forward power supply port; a powered device is connected to the forward power supply port; and the PSE chip is further configured to supply power to the powered device through the forward power supply port by using the power system.

According to a third aspect, a power supply method is provided. The power supply method includes:

when a first network device is supplied with power by a power source (the power is input by a local power source and/or forward power over Ethernet), supplying, by the first network device, power to a second network device through a first forward power supply port of the first network device, where the first forward power supply port is connected to the second network device; and when a power failure occurs on the first network device, stopping, by the first network device, supplying power to the first forward power supply port, and drawing power from the second network device through a first reverse power receiving port of the first network device, where the first reverse power receiving port is connected to the second network device.

Optionally, after the drawing power from the second network device, the method further includes:

supplying, by the first network device according to a power management policy, power to other powered devices different from a device reversely supplying power to the first network device.

Optionally, the other powered devices include at least two devices, and the supplying, by the first network device according to a power management policy, power to other powered devices different from a device reversely supplying power to the first network device includes:

determining, by the first network device, power supply priorities of the at least two devices, and supplying power to a target powered device based on the power supply priorities of the at least two devices, where the target powered device includes some or all of the at least two devices.

Optionally, the determining, by the first network device, power supply priorities of the at least two devices includes:

determining, by the first network device, the power supply priorities of the at least two devices based on data transmission parameters or port numbers of data ports corresponding to the at least two devices, where the data transmission parameters each are used to indicate at least one of a quantity of connected terminals and data traffic.

Optionally, the method further includes:

obtaining, by the first network device, required powers corresponding to the at least two devices; calculating a second supply power based on a first supply power, where the first supply power is a power of electric energy drawn through the first reverse power receiving port, and the second supply power is a maximum power used when a PSE chip supplies power to the at least two devices by using a power system; and determining the target powered device based on the power supply priorities of the at least two devices, the required powers corresponding to the at least two devices, and the second supply power.

Optionally, the first forward power supply port and the first reverse power receiving port are a same Ethernet port, or the first forward power supply port and the first reverse power receiving port are two Ethernet ports independent from each other.

Optionally, the method further includes:

when the first network device is supplied with the power by the power source (the power is input by a local power source and/or forward power over Ethernet), supplying, by the first network device, power to a third network device through a second forward power supply port of the first network device, where the second forward power supply port is connected to the third network device; and when the power failure occurs on the first network device, drawing, by the first network device, power from the third network device through a second reverse power receiving port of the first network device, where the second reverse power receiving port is connected to the third network device.

Optionally, the method further includes:

drawing, by the first network device, power from the fourth network device through a forward power receiving port of the first network device; and when detecting that power input of the forward power receiving port is stopped, supplying, by the first network device, power to the fourth network device through a reverse power supply port of the first network device.

According to a fourth aspect, a power supply system is provided, and the power supply system may include a first network device and a second network device. The first network device is configured to perform method steps corresponding to the first network device in the solution described in the third aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
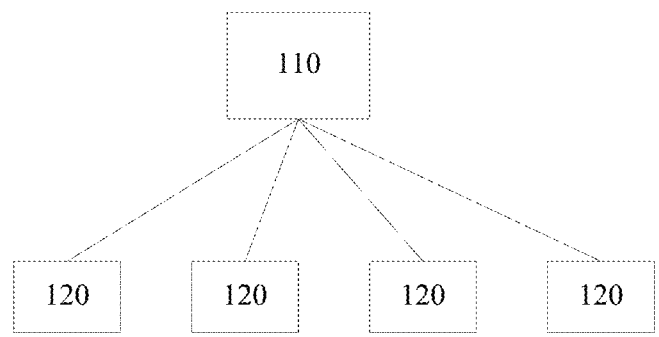
FIG. 1 is an architectural diagram of a network environment according to an embodiment of the present invention.

Referring to FIG. 1, FIG. 1 is an architectural diagram of a network environment according to an embodiment of the present invention. The network environment includes the following network devices: power sourcing equipment 110 and several powered devices 120.

The power sourcing equipment 110 is connected to the several powered devices 120 by using Ethernet cables, to form a part of power over Ethernet (English: Power Over Ethernet, POE for short) system or a POE system.

The POE system includes but is not limited to the two layers of devices: the power sourcing equipment 110 and the several powered devices 120. For example, an upper layer of the power supply device 110 may further include a third device (not shown in FIG. 1), and the third device is connected to the power sourcing equipment 110 by using an Ethernet cable; and an upper layer of the third device may further include a fourth device (not shown in FIG. 1), and the fourth device is connected to the third device by using an Ethernet cable. Other cases can be derived by analogy. Alternatively, a lower layer of the powered devices 120 may further include a fifth device (not shown in FIG. 1), and the fifth device is connected to the powered devices 120 by using Ethernet cables; and a lower layer of the fifth device may further include a sixth device (not shown in FIG. 1), and the sixth device is connected to the fifth device by using an Ethernet cable. Other cases can be derived by analogy.

In the POE system, when the power sourcing equipment 110 is supplied with power by a power source, the power sourcing equipment supplies power to the several powered devices 120 by using Ethernet cables, so that the several powered devices 120 implement respective functions In the solution described in the present invention, that a network device is supplied with power by a power source means that the power is input to the network device by a local power source and/or forward power over Ethernet. The local power source is a power source supplying power through a non-Ethernet port, for example, a power adapter of the network device or a built-in battery of the network device. The forward power over Ethernet means that in the POE, an upper-level device supplies power to a lower-level device by using an Ethernet cable. For example, in the POE system, the fourth device supplies power to the third device by using the Ethernet cable, the third device supplies power to the power sourcing equipment 120 by using the Ethernet cable, and the power sourcing equipment 110 supplies power to the powered devices 110 by using the Ethernet cables. All these cases may be referred to as forward power over Ethernet.

In the POE system, in addition to receiving, by using the Ethernet cable, electric energy supplied by the power sourcing equipment 110, some powered devices 120a of the several powered devices 120 may receive power supplied in another manner. For example, in addition to a port corresponding to the Ethernet cable connected to the power sourcing equipment 110, the some powered devices 120a may be provided with another power input port such as a built-in power port, an adapter power port, or another Ethernet port configured to receive electric energy. A powered device 120a may receive power by using the another power input port. When a power failure occurs on the power sourcing equipment 110, the some powered devices 120a may reversely supply power to the power sourcing equipment 110 by using the Ethernet cables between the powered devices 120a and the power sourcing equipment 110, so that the power sourcing equipment 110 may continue to implement inherent functions of the power sourcing equipment 110. In addition, the power sourcing equipment 110 may further supply, to a powered device 120b in the several powered devices 120 other than the some powered devices 120a, the electric energy reversely supplied by the some powered devices 120a.

It should be noted that, in the solution described in the present invention, that a power failure occurs on the network device means that power input by the local power source of the network device and/or forward power over Ethernet is stopped. For example, when power input of the network device includes only local power input and does not include forward power over Ethernet input, that a power failure occurs on the network device means that the local power source of the network device stops power input; when power input of the network device includes only forward power over Ethernet input and does not include local power input, that a power failure occurs on the network device means that a port, corresponding to forward power over Ethernet, of the network device stops power input; or when power input of the network device includes both local power input and forward power over Ethernet, that a power failure occurs on the network device means that the local power source of the network device stops power input, and a port, corresponding to forward power over Ethernet, of the network device stops power input.

In the POE system, a relationship between two adjacent layers of devices connected by using an Ethernet cable is similar to a relationship between the power sourcing equipment 110 and the several powered devices 120. To be specific, in a normal case, an upper-layer device supplies power to a lower-layer device by using the Ethernet cable. When a power failure occurs on the upper-layer device, the lower-layer device may reversely supply power to the upper-layer device by using an Ethernet cable, and the upper-layer device may further supply, to another lower-layer device by using an Ethernet cable, electric energy reversely supplied by the lower-layer device.

Figure 2:
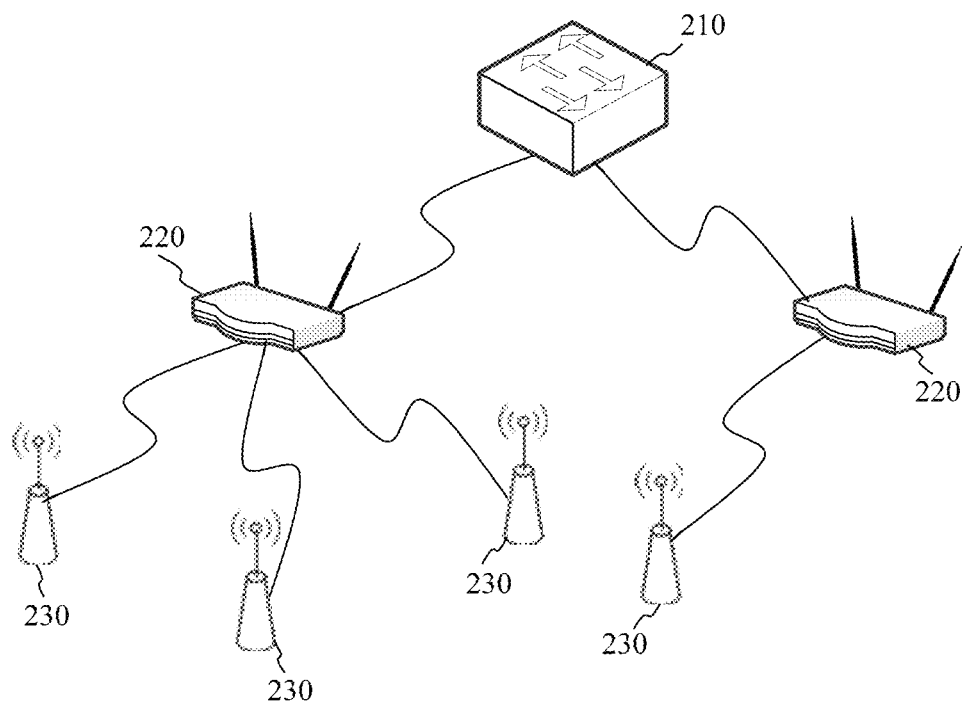
FIG. 2 is a schematic diagram of an implementation scenario according to an embodiment of the present invention.

Specifically, referring to FIG. 2, FIG. 2 is a schematic diagram of an implementation scenario of the present invention. The foregoing POE is a distributed wireless local area network (English: Wireless Local Area Networks, WLAN for short), and the distributed WLAN includes three layers of devices, where a first-layer device is a switch 210, a second-layer device is a central access point (English: access point, AP for short) 220, and a third-layer device is a distributed AP 230. The switch 210 is connected to the central AP 220 by using an Ethernet cable, and each central AP 220 is connected, by using an Ethernet cable, to a distributed AP 230 corresponding to the central AP 220.

In FIG. 2, for the switch 210 and the central AP 220, the switch 210 is equivalent to the power sourcing equipment 110 in FIG. 1, and the central AP 220 is equivalent to the powered device 120 in FIG. 1. For the central AP 220 and the distributed AP 230 corresponding to the central AP 220, the central AP 220 is equivalent to the power sourcing equipment 110 in FIG. 1, and the distributed AP 230 is equivalent to the powered device 120 in FIG. 1.

The foregoing content provides description by using the implementation scenario shown in FIG. 2 as an example. In an actual application, the solution described in the present invention may further be applied to a scenario other than the distributed wireless local area network shown in FIG. 2, provided that the implementation scenario provides the network environment shown in FIG. 1.

Figure 3:
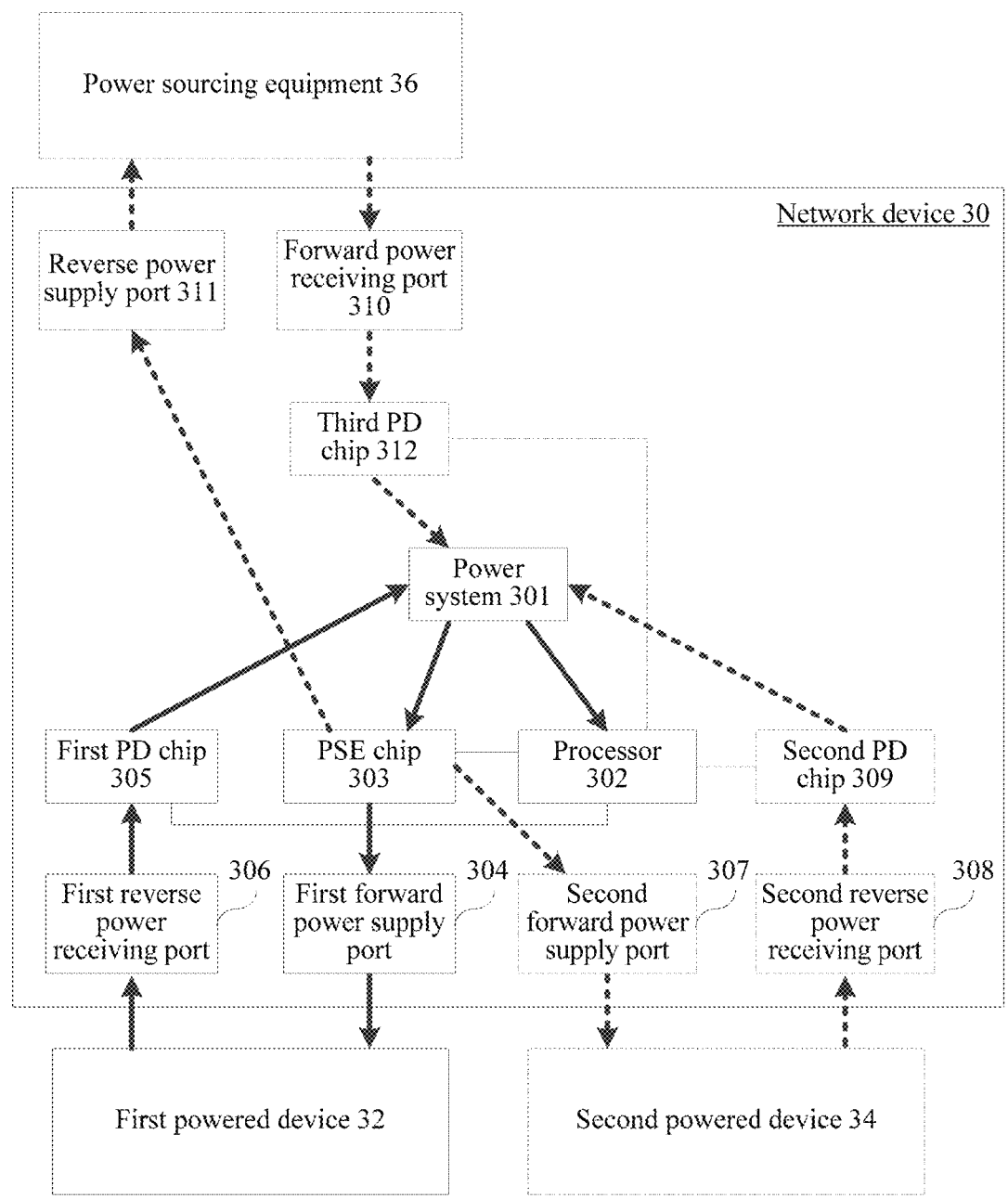
FIG. 3 is a structural diagram of a network device according to an embodiment of the present invention.

Referring to FIG. 3, FIG. 3 is a structural diagram of a network device according to an embodiment of the present invention. That the network device is the power sourcing equipment 110 in the network environment shown in FIG. 1 is used as an example. The network device 30 includes a power system 301, a processor 302, a power sourcing equipment PSE chip 303, a first forward power supply port 304, a first powered device PD chip 305, and a first reverse power receiving port 306.

The PSE chip 303 is connected to the first forward power supply port 304.

The first PD chip 305 is connected to the first reverse power receiving port 306.

The processor 302 is connected to the PSE chip 303.

The processor 302 may be a central processing unit (English: central processing unit, CPU for short), a network processor (English: network processor, NP for short), or another large-scale integrated circuit that can implement various processing functions performed in the present invention.

A first powered device 32 is connected to the first forward power supply port 304 and the first reverse power receiving port 306.

The power system 301 is configured to supply power to the processor 302 and the PSE chip 303.

The network device 30 may include a local power source (not shown in FIG. 3), and the local power source may be an external power source, for example, a power adapter, or the power source may be a built-in power source, for example, a built-in battery; and/or the network device 30 may be connected to an upper-level device by using an Ethernet cable. Correspondingly, the power system 301 may receive power input by the local power source of the network device 30; and/or the power system 301 may receive power input by an upper-level device through forward power over Ethernet. The power system 301 performs voltage conversion (voltage step down/voltage step up) on the input power, and supplies power to components, including the processor 302 and the PSE chip 303, in the network device 30.

The PSE chip 303 is configured to: when the network device 30 is supplied with power by a power source, supply power to the first powered device 32 by using the power system 301.

In this embodiment of the present invention, the power system 301 in the network device 30 may supply power to a powered device in addition to the components included in the network device 30. Specifically, when the network device 30 is supplied with power by a power source (for example, supplied with the power by using the foregoing external power adapter or the built-in battery, or supplied with the power by forward power over Ethernet), the PSE chip in the network device 30 may supply the power in the power system 301 to the first powered device 32 through the first forward power supply port 304.

The processor 302 is configured to: when detecting that a power failure occurs on the network device 30, instruct the first PD chip 305 to draw power from the first powered device 32; and the first PD chip 305 is configured to: when the power failure occurs on the network device 30, draw the power from the first powered device 32 through the first reverse power receiving port 306, and supply the obtained power to the power system 301.

In this embodiment of the present invention, whether a power failure occurs on the network device 30 is detected by the processor 302. For example, when power input of the network device 30 includes only local power input and does not include forward power over Ethernet input, if the processor 302 detects that the local power source stops power input, it is considered that a power failure occurs on the network device 30; when power input of the network device 30 includes only forward power over Ethernet input and does not include local power input, if the processor 302 detects that a port, corresponding to forward power over Ethernet, of the network device 30 stops power input, it is considered that a power failure occurs on the network device 30; or when power input of the network device 30 includes both local power input and forward power over Ethernet input, if the processor 302 detects that the local power source stops power input, and a port corresponding to forward power over Ethernet stops power input, it is considered that a power failure occurs on the network device 30.

After determining that a power failure occurs on the network device 30, the processor 302 sends a power drawing instruction to the first PD chip 305; after receiving the instruction, the first PD chip 305 draws the power from the first powered device 32 through the first reverse power receiving port 306, and supplies the drawn power to the power system 301; and the power system 301 supplies power to the processor 302 and the PSE chip 303 after performing voltage conversion.

After a power failure occurs on the network device 30, the PSE chip 303 stops supplying power to the first powered device 32 through the first forward power supply port 304, and after detecting that power input of a power receiving port, connected to the first forward power supply port 304, in the first powered device 32 is stopped, the first powered device 32 determines that a power failure occurs on the network device 30. In this case, the first powered device 32 supplies power to the first reverse power receiving port 306 of the network device 30 according to a predetermined reverse power supply policy, so that the network device 30 can draw power from the first powered device 32 through the first reverse power receiving port 306, where the reverse power supply policy means supplying power based on a predetermined reverse supply power.

Optionally, the processor 302 is further configured to: when the power failure occurs on the network device 30, instruct, according to a power management policy, the PSE chip 303 to supply power to a powered device other than the first powered device 32 by using the power system 301.

In this embodiment of the present invention, the network device 30 may be connected to one or more other powered devices in addition to the first powered device 32. After the power failure occurs on the network device 30, the network device 30 supplies, to a powered component of the network device 30, the power drawn from the first powered device 32, to ensure that the network device 30 works properly, and may further supply the drawn power to other powered devices different from the first powered device 32. Specifically, that the network device 30 supplies the drawn power to the other powered devices may be implemented by the processor 302 by instructing the PSE chip 303 according to a preset power management policy.

For example, the network device 30 may include other several forward power supply ports in addition to the first forward power supply port 304. The PSE chip 303 may also be connected to forward power supply ports (not shown in FIG. 3) corresponding to the other powered devices. When a power failure occurs on the network device 30, the PSE chip 303 may supply, based on an instruction of the processor 302, power (drawn from the first powered device 32) in the power system 301 to the other powered devices through the forward power supply ports corresponding to the other powered devices.

Optionally, the foregoing other powered devices include at least two devices, when the processor 302 instructs, according to the power management policy, the PSE chip to supply the power to the powered device other than the first powered device by using the power system, the processor 302 is specifically configured to: determine power supply priorities of the at least two devices according to a preset priority determining rule, and instruct, based on the power supply priorities of the at least two devices, the PSE chip 303 to supply power to a target powered device by using the power system 301, where the target powered device includes some or all of the at least two devices.

In an actual application, considering that a power of electric power drawn from the first powered device 32 may not meet requirements of all of the other powered devices, when the network device 30 supplies power to the other powered devices, if there are two or more powered devices, the network device 30 needs to perform power management on the other powered devices to properly allocate powers used for supplying power to the other powered devices. In this embodiment of the present invention, the processor 302 may determine the power supply priorities of the at least two other powered devices, and perform power management on the other powered devices based on the power supply priorities, for example, determine a target powered device from the at least two powered devices, and determine a power of electric power supplied to each target powered device.

Optionally, during determining the power supply priorities of the at least two devices, the processor 302 is specifically configured to determine the power supply priorities of the at least two devices based on data transmission parameters or port numbers of data ports corresponding to the at least two devices, where the data transmission parameters each are used to indicate at least one of a quantity of connected terminals and data traffic.

The data transmission parameters of the data ports corresponding to the at least two devices may be parameters that have been collected and maintained in real time before a power failure occurs on power sourcing equipment 36. After the power failure occurs on the power sourcing equipment 36, the network device 30 uses the data transmission parameters that have been collected and maintained before the power failure occurs on the power sourcing equipment 36, to perform a step of determining the power supply priorities.

For example, a quantity of mounted terminals may be a quantity of user terminals at a lowermost layer on a network. That the network device 30 is the central AP in FIG. 2 and the data port is a data port of the central AP is used as an example. The quantity of terminals may be a total quantity of terminals that are mounted in distributed APs and that are connected to the data port. When the data transmission parameters include the quantity of mounted terminals, the network device 30 determines the power supply priorities of the at least two devices based on a quantity of terminals connected to a data port corresponding to each of the at least two devices. For example, a larger quantity of terminals connected to a corresponding data port indicates a higher priority of a powered device; otherwise, a smaller quantity of terminals connected to a corresponding data port indicates a lower priority of a powered device.

Alternatively, data traffic of a data port may be a total of data traffic flowing through the data port within a predetermined time period, and the data traffic includes at least one of uplink data traffic and downlink data traffic. When the data transmission parameters include data traffic, the network device 30 may determine the power supply priorities of the at least two powered devices based on the data traffic. For example, larger data traffic of a corresponding data port indicates a higher priority of a powered device; otherwise, smaller data traffic of a corresponding data port indicates a lower priority of a powered device.

Alternatively, if the data transmission parameters include both a quantity of connected terminals and data traffic, the network device 30 may determine the power supply priorities of the other powered devices through weighing. For example, the quantity of terminals and the data traffic each are corresponding to a weight, and the network device 30 calculates weighed scores of the other powered devices based on the quantity of terminals connected to the data port corresponding to each of the other powered devices, the data traffic, and the weights. A powered device with a higher weighed score has a higher power supply priority.

Alternatively, the network device 30 may determine the power supply priorities based on the port numbers of the data ports corresponding to the other powered devices. For example, a smaller port number indicates a higher priority of a powered device.

Optionally, the processor 302 is further configured to: obtain required powers corresponding to the at least two devices; calculate a second supply power based on a first supply power, where the first supply power is a power of electric energy drawn through the first reverse power receiving port 306, and the second supply power is a maximum power used when the PSE chip 303 supplies power to the at least two devices by using the power system 301; and determine the target powered device based on the power supply priorities of the at least two devices, the required powers corresponding to the at least two devices, and the second supply power.

Specifically, for example, when a power failure occurs on the network device 30, the network device 30 draws 70-watt (that is, the first supply power) electric energy reversely supplied by the first powered device 32. The network device 30 consumes 18-watt electric energy. In this case, the network device 30 can supply a total of 52-watt electric energy (that is, the second supply power) to the other powered devices. Herein, assuming that forward power supply ports corresponding to the other powered devices (that is, the at least two devices) include a port 1, a port 2, and a port 3, and the port 1, port 2, and port 3 are sorted based on priorities, a descending priority sequence obtained after sorting is the port 3, the port 2, and the port 1. A required power of the port 3 is 30 watts, a required power of the port 2 is 25 watts, and a required power of the port 1 is 20 watts. After power is supplied to the port 3 and the port 2, if the processor 302 determines that a remaining power is not sufficient to supply power to the port 1, the processor 302 may determine powered devices corresponding to the port 3 and the port 2 as target powered devices.

Optionally, in a possible implementation solution, the processor 302 is further configured to: before a power failure occurs on the network device 30, determine the first supply power, by a physical layer detection or data link layer negotiation with the first powered device 32.

The step of negotiating the first supply power between the network device 30 and the first powered device 32 may be performed before a power failure occurs on the network device 30, so that after the power failure occurs on the network device 30, the network device 30 can determine, within a time period as short as possible, other specific powered devices to which forward power supply ports to be supplied with power corresponds. Specifically, the first supply power may be determined by the first powered device 32 through calculation and notified to the network device 30 by using a physical layer or data link layer message.

Optionally, the first forward power supply port 304 and the first reverse power receiving port 306 are a same Ethernet port; or the first forward power supply port 304 and the first reverse power receiving port 306 are two Ethernet ports independent from each other.

In this embodiment of the present invention, the network device 30 may be connected to the first powered device 32 by using only one Ethernet cable. In this case, the first forward power supply port 304 and the first reverse power receiving port 306 in the network device 30 are integrated in a same Ethernet port, and different cables in the Ethernet cable may be used to supply power to the first powered device 32 and draw power from the first powered device 32, respectively.

Alternatively, the network device 30 may be connected to the first powered device 32 by using only two Ethernet cables. In this case, the first forward power supply port 304 and the first reverse power receiving port 306 in the network device 30 may be disposed in different Ethernet ports. The network device 30 supplies power to the first powered device 32 by using one of the two Ethernet cables, and draws power from the first powered device 32 by using the another Ethernet cable.

Optionally, the network device 30 further includes a second forward power supply port 307, a second reverse power receiving port 308, and a second PD chip 309.

The PSE chip 303 is connected to the second forward power supply port 307, and the second PD chip 309 is connected to the second reverse power receiving port 308.

A second powered device 34 is connected to the second forward power supply port 307 and the second reverse power receiving port 308.

The PSE chip 303 is further configured to: when the network device 30 is supplied with the power by the power source, supply power to the second powered device 34 by using the power system 301.

The second PD chip 309 is configured to: when the power failure occurs on the network device 30, draw power from the second powered device 34 through the second reverse power receiving port 308, and supply the obtained power to the power system 301.

In this embodiment of the present invention, when a power failure occurs on the network device 30, in addition to the first powered device 32, the network device 30 may draw power from the second powered device 34 having a reverse power supply function. A manner in which the network device 30 draws power from the second powered device 34 is similar to a manner in which the network device 30 draws power from the first powered device 32. Details are not described herein again.

In this embodiment of the present invention, a single-channel PSE chip may be correspondingly disposed for each power supply port, or all power supply ports may share a multi-channel PSE chip. In other words, there may be one or more PSE chips 303 physically in this embodiment of the present invention.

Optionally, the network device 30 further includes a forward power receiving port 310, a reverse power supply port 311, and a third PD chip 312.

The forward power receiving port 310 is connected to the third PD chip 312, and the PSE chip 303 is connected to the reverse power supply port 311.

The processor 302 is connected to the third PD chip 312.

Power sourcing equipment 36 is connected to the forward power receiving port 310 and the reverse power supply port 311.

The third PD chip 312 is configured to: when the power sourcing equipment 36 is supplied with power by a power source, receive power from the power sourcing equipment 36 through the forward power receiving port 310, and supply the obtained power to the power system 301.

The processor 302 is further configured to: when a power failure occurs on the power sourcing equipment 36, instruct the PSE chip 303 to supply power to the power sourcing equipment 36 through the reverse power supply port 310 by using the power system 301, where the forward power receiving port 310 and the reverse power supply port 311 may be an Ethernet port or a part of the Ethernet port.

In this embodiment of the present invention, the network device 30 may receive power input by a power source of the network device 30, and may further obtain power from the power sourcing equipment 36 through the Ethernet port. In addition, when a power failure occurs on the power sourcing equipment 36, the network device 30 may further reversely supply the power in the power system 301 to the power sourcing equipment 36.

The processor 302 in the network device 30 determines, by detecting whether the forward power receiving port 310 is supplied with power, whether a power failure occurs on the power sourcing equipment 36. Specifically, if detecting that no power is supplied to the forward power receiving port 310, the processor 302 determines that a power failure occurs on the power sourcing equipment 36. In this case, the processor 302 instructs the PSE chip 303 to reversely supply power to the power sourcing equipment 36 according to a preset reverse power supply policy.

The processor 302 of the network device 30 may calculate, based on an input power of a local power source of the network device 30, a power consumed by the network device 30, and a total power used when the network device 30 supplies power to all powered devices, a reverse supply power used when the network device 30 reversely supplies power to the power sourcing equipment 36. For example, the processor 302 may obtain the foregoing reverse supply power by subtracting, from the input power of the local power source, the power consumed by the network device 30 and the total power used when the network device supplies the power to all the powered devices, and reversely supply power to the power sourcing equipment 36 based on the calculated reverse supply power during reversely supplying power to the power sourcing equipment 36 according to the preset reverse power supply policy.

To sum up, when the network device provided in this embodiment of the present invention is supplied with power by a power source, the network device supplies power to a powered device through an Ethernet port; and when a power failure occurs on the network device, the network device may draw power from a powered device through an Ethernet port. This ensures that the network device can continue to obtain power and work properly when the power failure occurs on the network device.

In addition, when the power failure occurs on the network device provided in this embodiment of the present invention and after the network device draws the power from the powered device, the network device supplies power to the processor, the PSE chip, or another component included in the network device, to ensure that the network device works properly; and the network device may further supply power to a powered device other than the powered device from which power is drawn, so as to continue to supply, when the power failure occurs on the network device, power to another powered device to which no power is input by a power source, thereby improving stability of POE power supply.

Figure 4:
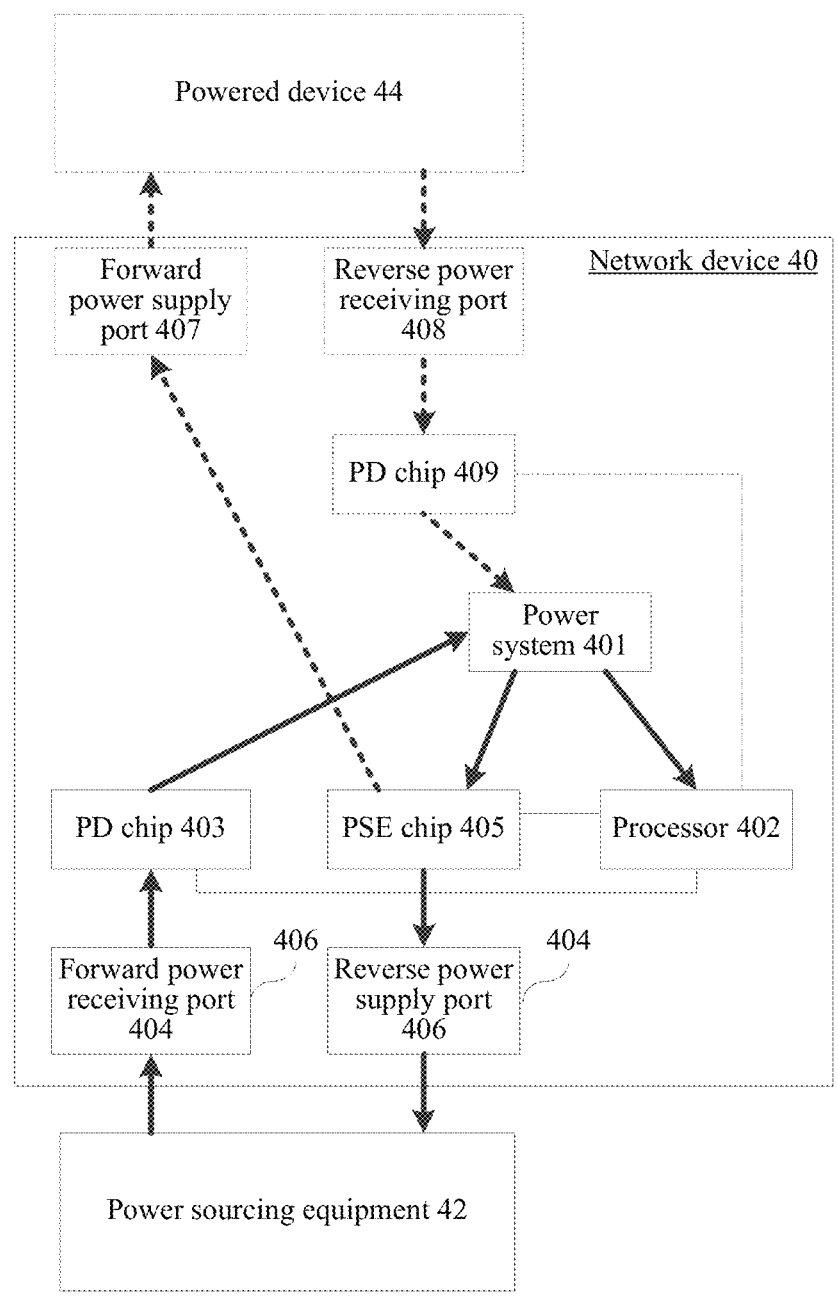
FIG. 4 is a structural diagram of a network device according to an embodiment of the present invention.

Referring to FIG. 4, FIG. 4 is a structural diagram of a network device according to an embodiment of the present invention. That the network device is the powered device 120 in the network environment shown in FIG. 1 is used as an example. The network device 40 includes a power system 401, a processor 402, a powered device PD chip 403, a forward power receiving port 404, a power sourcing equipment PSE chip 405, and a reverse power supply port 406.

The PSE chip 405 is connected to the reverse power supply port 406.

The PD chip 403 is connected to the forward power receiving port 404.

The processor 402 is connected to the PSE chip 405.

The processor 402 may be a CPU, an NP, or a large-scale integrated circuit that can implement various processing functions performed in the present invention.

Power sourcing equipment 42 is connected to the forward power receiving port 404 and the reverse power supply port 406.

The power system 401 is configured to supply power to the processor 402 and the PSE chip 405.

The PD chip 403 is configured to draw power from the power sourcing equipment 42 through the forward power receiving port 404, and supply the obtained power to the power system 401.

In this embodiment of the present invention, when power is input through the forward power receiving port 404 connected to the power sourcing equipment 42, the PD chip 403 may draw power from the power sourcing equipment 42, and supply the power to the power system 401; and the power system 401 supplies power to components, including the processor 402 and the PSE chip 405, in the network device 40.

The processor 402 is configured to: when no power is supplied to the forward power receiving port 404, instruct, according to a reverse power supply policy, the PSE chip 405 to supply power to the power sourcing equipment 42 through the reverse power supply port 406.

The PSE chip 405 is configured to supply, according to a reverse power instruction of the processor 402, the power to the power sourcing equipment 42 by using the power system 401.

The network device 40 further includes a local power source (not shown in FIG. 4), and the local power source may be an external power source, for example, a power adapter, or the power source may be a built-in power source, for example, a built-in battery. The power system 401 may receive power input by the local power source of the network device 40, and perform voltage conversion (voltage step down/voltage step up) on the input power. In this case, in addition to the components in the network device 40, the power system 401 may supply power to the power sourcing equipment 42 through the reverse power supply port 406 connected to the power sourcing equipment 42, so that the power sourcing equipment 42 can continue to obtain power and work properly when a power failure occurs on the power sourcing equipment 42.

Optionally, the processor 402 is further configured to: when the forward power receiving port 404 is supplied with power, negotiate with the power sourcing equipment 42 to determine a first supply power.

During instructing, according to the reverse power supply policy, the PSE chip 405 to supply the power to the power sourcing equipment 42 through the reverse power supply port 406, the processor 402 is specifically configured to instruct the PSE chip 405 to supply power to the power sourcing equipment 42 through the reverse power supply port 406 by using the first supply power.

In this embodiment of the present invention, the network device 40 may calculate a difference between a total input power and a power consumed by the network device 40, as the first supply power. The total input power is a power of electric energy received by the network device 40 through a power input port other than the forward power receiving port 404.

For example, the network device 40 is a switch and the power sourcing equipment 42 is a central AP. Another power input port of the switch includes a power adapter port. Assuming that the power consumed by the switch is 28 watts, and that a power of electric energy input through the power adapter port is 220 watts, the first supply power is 192 watts.

Optionally, the network device 40 further includes a forward power supply port 407.

The PSE chip 405 is connected to the forward power supply port 407.

A powered device 44 is connected to the forward power supply port 407.

The PSE chip 405 is further configured to supply power to the powered device 44 through the forward power supply port 407 by using the power system 401.

In this embodiment of the present invention, a single-channel PSE chip may be correspondingly disposed for each power supply port, or all power supply ports may share a multi-channel PSE chip. In other words, there may be one or more PSE chips 405 physically in this embodiment of the present invention.

Optionally, the network device 40 may further include a reverse power receiving port 408 and a PD chip 409 corresponding to the reverse power receiving port 408.

The reverse power receiving port 408 is connected to the PD chip 409, and the powered device 44 is connected to the reverse power receiving port 408.

The processor 402 is further configured to: when a power failure occurs on the network device 40 and no power is supplied to the forward power receiving port 404, instruct the PD chip 409 to draw power from the powered device 44; and the PD chip 409 is configured to: when the power failure occurs on the network device 40 and no power is supplied to the forward power receiving port 404, draw the power from the powered device 44 through the reverse power receiving port 408 and supply the obtained power to the power system 401.

A process in which the processor 402 instructs the PD chip 409 to draw power from the powered device 44 is similar to a process that is in the embodiment corresponding to FIG. 3 and in which the processor 302 instructs the first PD chip 305 to draw power from the first powered device 32. Details are not described herein again.

To sum up, when power is input to the forward power receiving port, the network device provided in this embodiment of the present invention draws power from the power sourcing equipment through an Ethernet port; and when no power is input to the forward power receiving port, the network device supplies power to the power sourcing equipment through an Ethernet port, so that the power sourcing equipment can still draw power from the powered device through the Ethernet port when a power failure occurs on the power sourcing equipment. This ensures that the power sourcing equipment can continue to obtain power and work properly when the power failure occurs on the power sourcing equipment.

Figure 5:
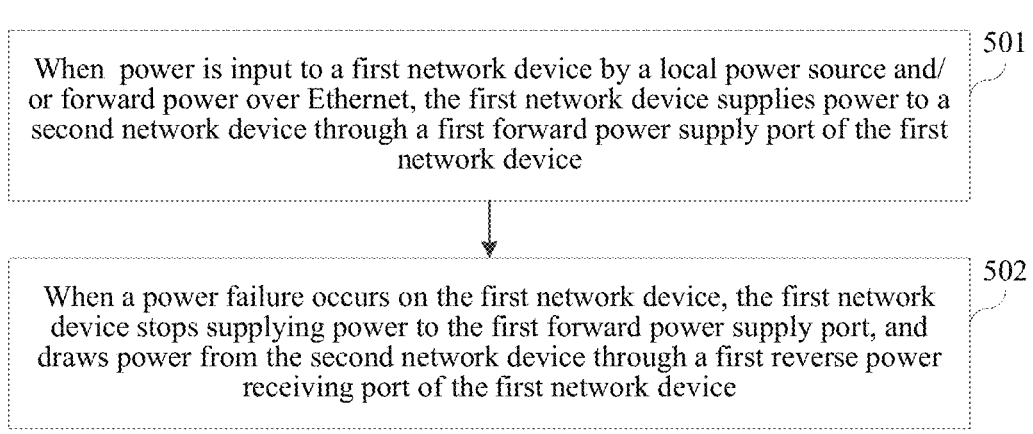
FIG. 5 is a flowchart of a power supply method according to an embodiment of the present invention.

Referring to FIG. 5, FIG. 5 is a flowchart of a power supply method according to an embodiment of the present invention. The method may include the following steps.

Step 501. When a first network device is supplied with power by a power resource (the power is input by a local power source and/or forward power over Ethernet), the first network device supplies power to a second network device through a first forward power supply port of the first network device.

The first forward power supply port is connected to the second network device.

Step 502. When a power failure occurs on the first network device, the first network device stops supplying power to the first forward power supply port, and draws power from the second network device through a first reverse power receiving port of the first network device.

The first reverse power receiving port is connected to the second network device.

The first network device may be the power sourcing equipment 110 in the network environment shown in FIG. 1, and the second network device may be a powered device 120 in the network environment shown in FIG. 1. That the first network device performs forward power supply on the second network device and that the second network device reversely supplies power to the first network device may be implemented by a processor in the first network device or the second network device by controlling a PSE chip. For details, refer to related description of the processor and the PSE chip in the network device shown in FIG. 3 or FIG. 4. Details are not described herein again.

Optionally, after the drawing power from the second network device, the method further includes supplying, by the first network device according to a power management policy, power to other powered devices different from the device reversely supplying power to the first network device.

That the first network device supplies power to the other powered devices may be implemented by the processor in the first network device by controlling the PSE chip. For details, refer to related description of the processor and the PSE chip in the network device shown in FIG. 3. Details are not described herein again.

Optionally, the foregoing other powered devices include at least two devices, and during supplying the power to the other powered devices according to the power management policy, the first network device determines power supply priorities of the at least two devices according to a preset priority determining rule, and supplies power to a target powered device based on the power supply priorities of the at least two devices, where the target powered device includes some or all of the at least two devices.

Optionally, during determining the power supply priorities of the at least two devices, the first network device may determine the power supply priorities of the at least two devices based on data transmission parameters or port numbers of data ports corresponding to the at least two devices, where the data transmission parameters each are used to indicate at least one of a quantity of connected terminals and data traffic.

Optionally, the method further includes: obtaining, by the first network device, required powers corresponding to the at least two devices; calculating a second supply power based on a first supply power, where the first supply power is a power of electric energy drawn through the first reverse power receiving port, and the second supply power is a maximum power used when the PSE chip supplies power to the at least two devices by using a power system; and determining the target powered device based on the power supply priorities of the at least two devices, the required powers corresponding to the at least two devices, and the second supply power.

A process of determining, by the first network device, the power supply priorities of all the powered devices and determining the target powered device may be implemented by the processor in the first network device. For details, refer to related description of the processor in the network device shown in FIG. 3. Details are not described herein again.

Optionally, the first forward power supply port and the first reverse power receiving port are a same Ethernet port, or the first forward power supply port and the first reverse power receiving port are two Ethernet ports independent from each other.

Optionally, the method further includes: when the first network device is supplied with the power by the power source (the power is input by a local power source and/or forward power over Ethernet), supplying, by the first network device, power to a third network device through a second forward power supply port of the first network device, where the second forward power supply port is connected to the third network device; and when the power failure occurs on the first network device, drawing, by the first network device, power from the third network device through a second reverse power receiving port of the first network device, where the second reverse power receiving port is connected to the third network device.

The third network device may be a powered device, other than the second network device, in the at least one powered device 120 in the network environment shown in FIG. 1.

Optionally, the method further includes: drawing, by the first network device, power from a fourth network device through a forward power receiving port of the first network device; and when detecting that power input of the forward power receiving port is stopped, supplying, by the first network device, power to the fourth network device through a reverse power supply port of the first network device.

The fourth network device may be at an upper layer of the power sourcing equipment 110 in the network environment shown in FIG. 1, and may be a device (not shown in FIG. 1) supplying power to the power sourcing equipment 110. Alternatively, with reference to the implementation scenario shown in FIG. 2, the first network device is a central AP 220, and the fourth network device is a switch 210.

The first network device determines, by detecting whether the forward power receiving port is supplied with power, whether a power failure occurs on the fourth network device. Specifically, if detecting that no power is supplied to the forward power receiving port, the first network device determines that a power failure occurs on the fourth network device.

The first network device may further calculate, based on an input power of a local power source of the first network device, a power consumed by the first network device, and a total power used when the first network device supplies power to all powered devices, a reverse supply power used when the first network device reversely supplies power to the fourth network device. When reversely supplying power to the fourth network device, the first network device reversely supplies power to the fourth network device based on the calculated reverse supply power.

An embodiment of the present invention further provides a power supply system, and the power supply system may include a first network device and a second network device.

The first network device may be implemented as the power sourcing equipment 110 in the network environment shown in FIG. 1, and the second network device may be implemented as a powered device 120 in the network environment shown in FIG. 1. For a connection relationship between the first network device and the second network device, refer to a connection relationship between the network device 30 and the powered device 32 in FIG. 3.

Optionally, the power supply system may further include a third network device, and the third network device may be implemented as another powered device 120 in the network environment shown in FIG. 1. For a connection relationship between the third network device and the first network device, refer to a connection relationship between the powered device 34 and the network device 30 in FIG. 3.

Optionally, the power supply system may further include a fourth network device, and the fourth network device may be implemented as a device (not shown in FIG. 1), supplying power to the power sourcing equipment 110, in the network environment shown in FIG. 1. Alternatively, the fourth network device is a switch 210, supplying power to a central AP 220, in the implementation scenario shown in FIG. 2. For a connection relationship between the fourth network device and the first network device, refer to a connection relationship between the power sourcing equipment 36 and the network device 30 in FIG. 3.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, a compact disc, or the like.

The foregoing descriptions are merely examples of embodiments of the present invention, but are not intended to limit the present invention. Any modification, equivalent replacement, and improvement made without departing from the principle of the present invention shall fall within the protection scope of the present invention.

What is claimed is:

1. A network device, comprising a power system, a processor, a power sourcing equipment PSE chip, a first forward power supply port, a first powered device PD chip, and a first reverse power receiving port, wherein
   the PSE chip is connected to the first forward power supply port;
   the first PD chip is connected to the first reverse power receiving port;
   the processor is connected to the PSE chip;
   a first powered device is connected to the first forward power supply port and the first reverse power receiving port;
   the power system is configured to supply power to the processor and the PSE chip;
   the PSE chip is configured to: when the network device is supplied with power by a power source, supply power to the first powered device by using the power system;
   the processor is configured to: when detecting that a power failure occurs on the network device, instruct the first PD chip to draw power from the first powered device; and
   the first PD chip is configured to: when the power failure occurs on the network device, draw the power from the first powered device through the first reverse power receiving port, and supply the obtained power to the power system;
   the processor is specifically configured to:
   when the power failure occurs on the network device, instruct, according to a power management policy, the PSE chip to supply power to a powered device other than the first powered device by using the power system, wherein the powered device other than the first powered device comprises at least two devices, and during instructing, according to the power management policy, the PSE chip to supply the power to the powered device other than the first powered device by using the power system,
determine power supply priorities of the at least two devices according to a preset priority determining rule, and instruct, based on the power supply priorities of the at least two devices, the PSE chip to supply power to a target powered device by using the power system, wherein the target powered device comprises some or all of the at least two devices,
wherein the power supply priorities of the at least two devices is based on data transmission parameters and port numbers of data ports corresponding to the at least two devices, wherein the data transmission parameters each are used to indicate a quantity of connected terminals and data traffic, wherein a weight is applied to the quantity of connected terminals and data traffic, and the data transmission parameters are determined based on a weighted combination of the quantity of connected terminals and data traffic.

2. The network device according to claim 1, wherein the processor is further configured to:
obtain required powers corresponding to the at least two devices;
calculate a second supply power based on a first supply power, wherein the first supply power is a power of electric energy drawn through the first reverse power receiving port, and the second supply power is a maximum power used when the PSE chip supplies power to the at least two devices by using the power system; and
determine the target powered device based on the power supply priorities of the at least two devices, the required powers corresponding to the at least two devices, and the second supply power.

3. The network device according to claim 1, wherein the first forward power supply port and the first reverse power receiving port are a same Ethernet port, or the first forward power supply port and the first reverse power receiving port are two Ethernet ports independent from each other.

4. The network device according to claim 1, wherein the network device further comprises a second forward power supply port, a second reverse power receiving port, and a second PD chip, wherein
the PSE chip is connected to the second forward power supply port, and the second PD chip is connected to the second reverse power receiving port;
a second powered device is connected to the second forward power supply port and the second reverse power receiving port;
the PSE chip is further configured to: when the network device is supplied with the power by the power source, supply power to the second powered device by using the power system; and
the second PD chip is configured to: when the power failure occurs on the network device, draw power from the second powered device through the second reverse power receiving port, and supply the obtained power to the power system.

5. The network device according to claim 1, wherein the network device further comprises a forward power receiving port, a reverse power supply port, and a third PD chip, wherein the forward power receiving port is connected to the third PD chip, and the PSE chip is connected to the reverse power supply port;
the processor is connected to the third PD chip;
power sourcing equipment is connected to the forward power receiving port and the reverse power supply port;
the third PD chip is configured to: when the power sourcing equipment is supplied with power by a power source, receive power from the power sourcing equipment through the forward power receiving port, and supply the obtained power to the power system; and
the processor is further configured to: when a power failure occurs on the power sourcing equipment, instruct the PSE chip to supply power to the power sourcing equipment through the reverse power supply port by using the power system.

6. A network device, comprising a power system, a processor, a powered device PD chip, a forward power receiving port, a power sourcing equipment PSE chip, and a reverse power supply port, wherein
the PSE chip is connected to the reverse power supply port;
the PD chip is connected to the forward power receiving port;
the processor is connected to the PSE chip;
power sourcing equipment is connected to the forward power receiving port and the reverse power supply port;
the power system is configured to supply power to the processor and the PSE chip;
the PD chip is configured to draw power from the power sourcing equipment through the forward power receiving port, and supply the obtained power to the power system;
the processor is configured to: when no power is supplied to the forward power receiving port, instruct, according to a reverse power supply policy, the PSE chip to supply power to the power sourcing equipment through the reverse power supply port; and
the PSE chip is configured to supply, according to a reverse power supply instruction of the processor, the power to the power sourcing equipment by using the power system, wherein the reverse power supply instruction is based on power supply priorities based on data transmission parameters and port numbers of data ports corresponding to the network device, wherein the data transmission parameters each are used to indicate a quantity of connected terminals and data traffic, and wherein a weight is applied to the quantity of connected terminals and data traffic, and the data transmission parameters are based on a weighted combination of the quantity of connected terminals and data traffic.

7. The network device according to claim 6, wherein the processor is further configured to: when the forward power receiving port is supplied with power, negotiate with the power sourcing equipment to determine a first supply power; and
during instructing, according to the reverse power supply policy, the PSE chip to supply the power to the power sourcing equipment through the reverse power supply port, the processor is specifically configured to instruct the PSE chip to supply power to the power sourcing equipment through the reverse power supply port by using the first supply power.

8. The network device according to claim 6, wherein the network device further comprises a forward power supply port, wherein
- the PSE chip is connected to the forward power supply port;
- a powered device is connected to the forward power supply port; and
- the PSE chip is further configured to supply power to the powered device through the forward power supply port by using the power system.

9. A power supply method, comprising:
- when a first network device is supplied with power by a power source, supplying, by the first network device, power to a second network device through a first forward power supply port of the first network device, wherein the first forward power supply port is connected to the second network device; and
- when a power failure occurs on the first network device, stopping, by the first network device, supplying power to the first forward power supply port, and drawing power from the second network device through a first reverse power receiving port of the first network device, wherein the first reverse power receiving port is connected to the second network device;
- wherein after the drawing power from the second network device, the method further comprises:
- supplying, by the first network device according to a power management policy, power to other powered devices different from a device reversely supplying power to the first network device;
- wherein the other powered devices comprise at least two devices, and the supplying, by the first network device according to a power management policy, power to other powered devices different from a device reversely supplying power to the first network device comprises:
- determining, by the first network device, power supply priorities of the at least two devices based on data transmission parameters and port numbers of data ports corresponding to the at least two devices, wherein the data transmission parameters each are used to indicate a quantity of connected terminals and data traffic, and supplying power to a target powered device based on the power supply priorities of the at least two devices, wherein the target powered device comprises some or all of the at least two devices, and wherein a weight is applied to the quantity of connected terminals and data traffic, and the data transmission parameters are based on a weighted combination of the quantity of connected terminals and data traffic.

10. The method according to claim 9, wherein the method further comprises:
- obtaining, by the first network device, required powers corresponding to the at least two devices; calculating a second supply power based on a first supply power, wherein the first supply power is a power of electric energy drawn through the first reverse power receiving port, and the second supply power is a maximum power used when a PSE chip supplies power to the at least two devices by using a power system; and determining the target powered device based on the power supply priorities of the at least two devices, the required powers corresponding to the at least two devices, and the second supply power.

11. The method according to claim 9, wherein the first forward power supply port and the first reverse power receiving port are a same Ethernet port, or the first forward power supply port and the first reverse power receiving port are two Ethernet ports independent from each other.

12. The method according to claim 9, wherein the method further comprises:
- when the first network device is supplied with the power by the power source, supplying, by the first network device, power to a third network device through a second forward power supply port of the first network device, wherein the second forward power supply port is connected to the third network device; and
- when the power failure occurs on the first network device, drawing, by the first network device, power from the third network device through a second reverse power receiving port of the first network device, wherein the second reverse power receiving port is connected to the third network device.

13. The method according to claim 9, wherein the method further comprises:
- drawing, by the first network device, power from a fourth network device through a forward power receiving port of the first network device; and
- when detecting that power input of the forward power receiving port is stopped, supplying, by the first network device, power to the fourth network device through a reverse power supply port of the first network device.

* * * * *